Sept. 27, 1966 R. A. STOVER 3,276,003

AIR BEARING MAGNETIC HEAD MOUNTING ASSEMBLY

Filed Aug. 6, 1963 2 Sheets-Sheet 1

INVENTOR.
RICHARD A. STOVER

BY
Sughrue, Rothwell, Mion, Zinn
ATTORNEYS.

INVENTOR.
RICHARD A. STOVER

BY Sieghart, Rothwell, Mion, Zinn
ATTORNEYS.

3,276,003

AIR BEARING MAGNETIC HEAD MOUNTING ASSEMBLY

Richard A. Stover, Perkinsville, Vt., assignor to Vermont Research Corporation
Filed Aug. 6, 1963, Ser. No. 300,258
8 Claims. (Cl. 340—174.1)

This invention relates to improvements in the mounting assemblies for magntic heads of the "floating," "flying," or "gliding" type.

Magnetic heads which ride on a hydrodynamically created film of air which clings to the surface of a rapidly rotating magnetic drum or disk are well known in the magnetic recording art. It is, of course, highly desirable that the heads do not come in physical contact with the surface of the rapidly rotating recording member in order to avoid damage. It is also desirable that provision be made for adjusting the loading or bias of the magnetic heads downward into the hydrodynamically created film of air. This amount of bias affects the spacing of the transducer from the recording medium. In copending application Serial No. 105,383, "Magnetic Head," now Patent 3,180,944, granted April 27, 1965. I have disclosed an arrangement for always retracting the head when the magnetic record is not up to speed to create the supporting film and also an adjustment for the bias of a single reed support.

In arrangements wherein a plurality of heads are mounted side-by-side it is highly desirable to control the position of the head mounting member so that all of the heads are at the same spacing from the surface of the magnetic record. That is, it is undesirable for one head to be closer than the other, or for one edge of a single head to be closer than the other edge, as the quality of recording is adversely affected.

In a freely supported assembly of floating or gliding magnetic heads there is a free or unloaded position at which no loading force is applied to the head assembly and this position is related to the point of tangency of a rotating magnetic record surface. This unloaded position and the loading force applied are partially determinative of the actual air film thickness and the spacing between the head and the magnetic record.

It is an object of this invention to provide adjustment means in a mounting assembly for flying heads riding on a hydrodynamic film of air in which the deflection of a loading member loading the head is adjustable and in which further common adjustment means not only control the attitude or twisting of a pad of heads relative to the drum but also control the initial unloaded position of the head relative to the drum and also in which a single reed support is utilized for a plurality of magnetic heads mounted in a head carrying pad.

Other objects and advantages of the invention will be pointed out in the following description and claims and illustrated in the accompanying drawings, which disclose, by way of example, the principles of the invention and the best mode which has been contemplated of applying these principles.

Figures 1, 2, 3:
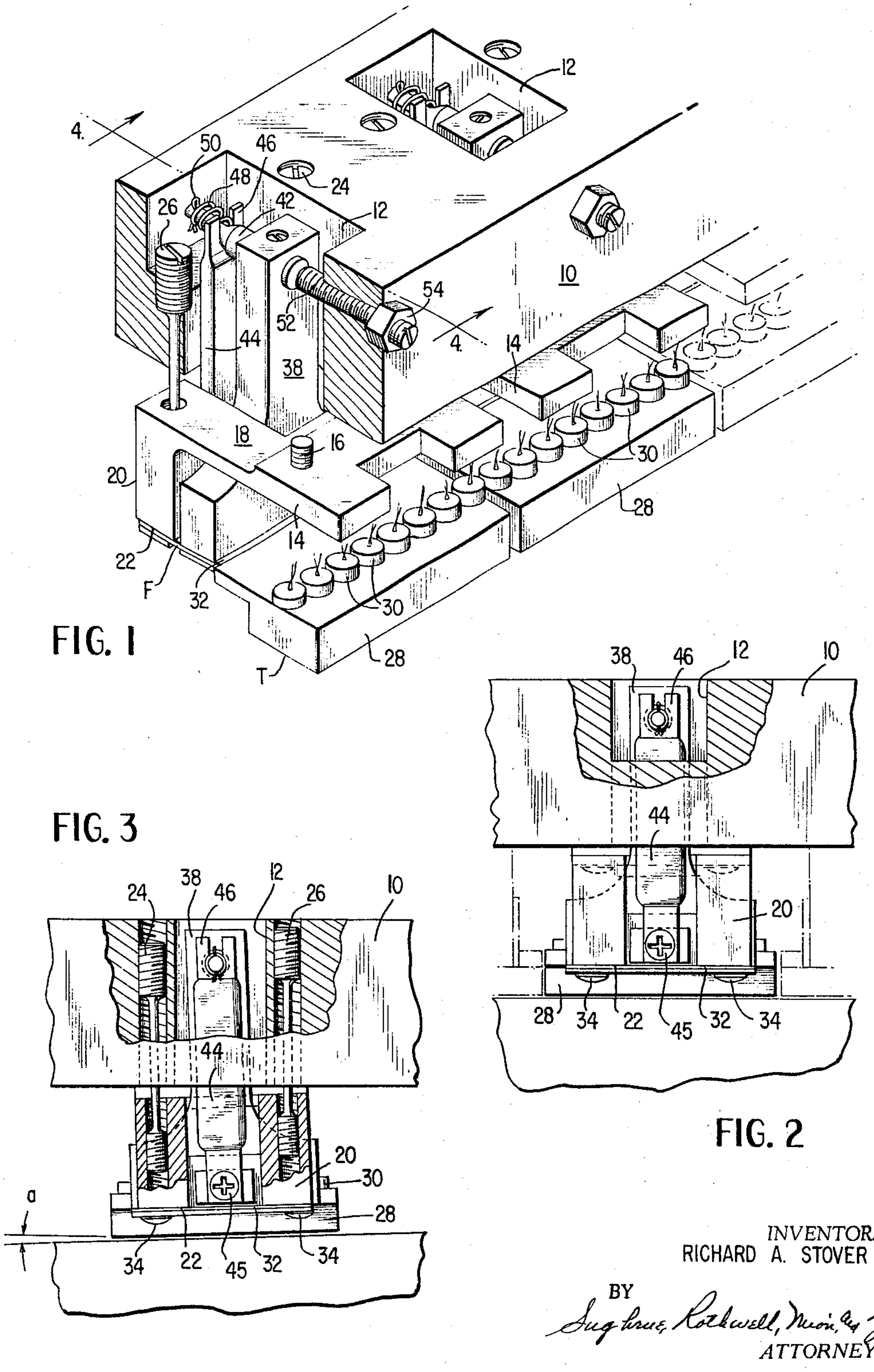
FIG. 1 is a perspective view with portions broken away and shown in section for the sake of clarity in illustrating the magnetic head mounting assembly which is the preferred embodiment of this invention.
FIG. 2 is a side elevational view with certain portions of the mounting bar broken away for the sake of clarity.
FIG. 3 is an elevational view similar to FIG. 2 but with other portions shown in section for the sake of clarity.

Referring specifically to the drawings, in FIGS. 1–4, there is shown a common mounting bar 10 which may be of any predetermined length for mounting any desired number of transducers adjacent a movable magnetic recording medium such as a disc or drum. This mounting bar would be attached to a magnetic drum housing (not shown). The mounting bar 10 includes recessed holes 12 and the mounting bar in turn supports a deflection member 14. End 15 of the deflection member is attached to the undersurface of the mounting bar 10 by means of screws 16. The deflection member 14, in addition to its mounting end 15, includes spaced flexure portions 18 and a depending mounting portion 20 having a bottom reference surface 22. Adjustment screws 24 and 26 having differential threads on two portions thereof are threaded into the deflection member 14 and the mounting bar 10 as shown in FIGS. 1 and 3. The differential threads allow for very close and precise adjustment.

A transducer pad 28 carries a plurality of transducers 30 mounted rigidly therein. The bottom surface T of the transducer pad assembly is lapped to provide a flat surface for cooperation with hydrodynamically created film of air clinging to the surface of the rapidly moving magnetic recording medium R.

Supporting the transducer pad is a single reed or leaf spring 32 secured to the reference surface 22 by rivets 34 and to the transducer pad 28 by rivets 36. For loading the reed spring 32 there is provided a T-shaped loading member 38 secured to the reed spring 32 by rivets 40 fairly close to the depending mounting portion 20. This arrangement creates a finite length F of reed 32 between the depending portion 20 and the loading member 38 where the reed flexes and this serves as a simple reed pivot.

For applying the force to create a predetermined loading on the transducers there is provided a heated bimetal motor 44 of the type disclosed in detail in my aforesaid Patent 3,180,944. The heater for the bimetal is also connected to the motor drive as shown in detail in my copending application so that the head is retracted until the magnetic record surface R is up to the speed to create the film of air upon which the transducer assembly and surface T rides. The bimetal motor 44 is connected at its lower end by suitable screws 45 to the depending portion 20 of deflection member 14. The upper member of heated bimetal motor 44 includes a yoke 46 surrounding a reduced diameter portion on a contact pin 42 which projects from loading member 38. An extension on pin 42 mounts a spring stop 50 such as a cotter pin and a compression spring 48. With this arrangement the compression spring serves to retract the loading member 38 to the normal position shown in FIG. 4, for example, while not affecting the movement of the loading member 38 to the right as viewed in FIG. 4 for the purpose of loading or biasing the transducer toward the record.

For adjusting the degree or amount of loading and bias there is provided a screw stop 52 threaded through the common mounting bar 10 and a lock nut 54 for the screw. The stop 52 determines the extent of movement of the loading member 38 to the right as viewed in FIG. 4 and therefore the amount of flexure of the reed 32 at its flexure area F.

Figure 10:
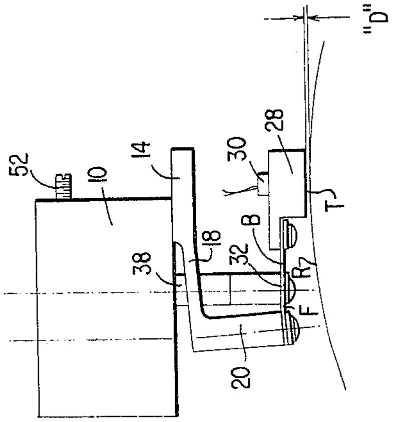
FIGS. 8, 9 and 10 show schematically a head adjustment and operating condition providing a wider spacing between the surface of the head and the magnetic record with a small drop in the unloaded position.
Figure 4:
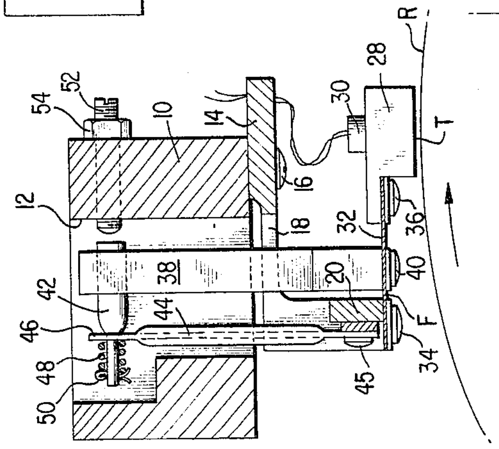
FIG. 4 is an end sectional view taken along line 4—4 of FIG. 1.

The operation of the mounting assembly for the flying head or gliding head transducers will now be described. In the at rest condition, the bimetal motor 44 will be unheated and will be straight as shown in FIG. 4. The spring 48 will hold the loading member 38 in the position shown in FIG. 4 and in this condition the transducers are not loaded. The distance between the bottom surface T of the transducer assembly and the surface of the record R is termed the "drop," shown by dimension D in FIGS. 7 and 10. By adjusting screws 24 and 26 from the top of mounting bar 10 an equal amount, the deflection member 14 flexes about flexure portion 18 and moves reference surface 22 closer to the drum. Accordingly, the drop or free position can be lowered or raised as illustrated by a comparison of FIGS. 7 and 10. In FIG. 10, for example, the differential screws 24 and 26 have been adjustable equally inwardly to move the deflection member downwardly and to create a small drop and also to flex the deflection member 14 about its torsion flexure portion 18.

After the record surface R is up to speed, the bimetal motor 44 has been heated and it flexes to the right as viewed in FIG. 4 and causes the loading member 38 to move to the right until contact pin 42 abuts adjustable stop 52. This in turn causes flexure of reed 32 about flexure point F as shown, for example, in FIGS. 5, 6, 8 and 9. The adjustment screw 52 may be backed off until the magnetic head outputs reach a maximum. This occurs at the time the transducer pad surface T is tangent to the surface of the record R at the centerline of the recording gap.

As shown in FIGS. 1–3, there are a plurality of heads 30 mounted in the pad 28. The heads on one end or the other of the pad may be closer than the heads of the other end of the pad due to twisting of the support or otherwise. The amount of non-parallelism shown by angle "*a*" in FIG. 3 is very slight in the terms of actual physical dimensions but very significant in terms of air film thickness and the associated difference is in the quality of magnetic recording. Thus, the ability to twist or compensate for any slight non-parallelism is a very important feature of this invention. To accomplish adjustment for non-parallelism out of the angle "*a*" as shown in FIG. 3, the threads of screw 24 would be turned down while the drum is rotating and the pad is flying to move that end of the pad 28 down until output signals from the end heads are equal. It should be noted that the slight twist adjustment does not measurably affect the drop adjustment even though done with the same screws. In actual practice the twist adjustment may be in the order of 0.0001 inch to 0.0002 inch in the length of one pad whereas the drop dimensions are in the order of 0.005 inch to 0.015 inch depending on the film thickness required for various recording applications.

Figure 7:
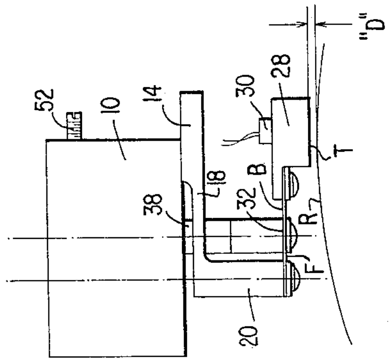
FIGS. 5, 6 and 7 illustrate schematically the operation of the head adjustment means for providing close spacing between the head and drum with a large drop in the unloaded position.
Figure 6:
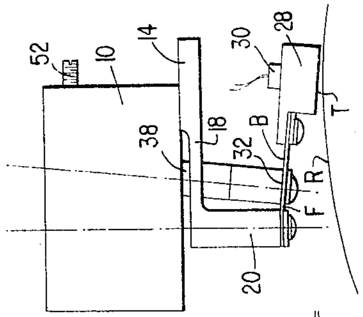
Figure 5:
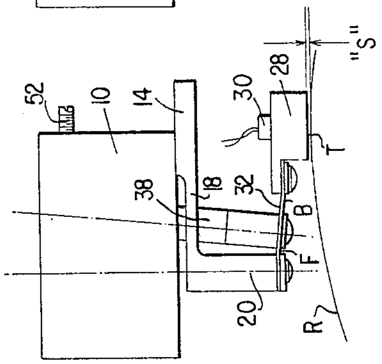
Figure 8:
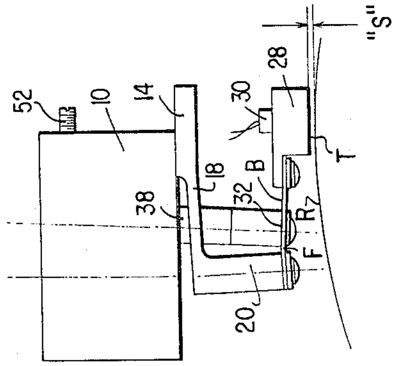

FIGS. 5, 6 and 7 illustrate the situation with a large drop D. The retracted position is shown in FIG. 7. The approach position after the drum is up to speed and the loading has been applied to deflect the reed 32 about flexure point F is shown in FIG. 6. At this time, the film is causing a build-up under the outer toe or tip of the transducer pad 28. The biasing of the spring 32 caused by heavy bending about bend area B in reed spring 32 may then be applied by backing off an adjustment screw 52 until the spacing S between the surface of the record R and the surface of the transducer T is quite close.

Figure 9:
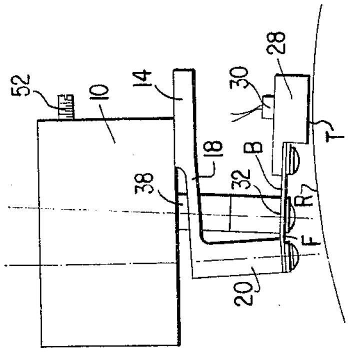

The small drop situation is illustrated in FIG. 10. In this situation, the differential screws 24 and 26 are adjusted inwardly to cause flexure of deflection member 14 equally in flexure potrions 18 and to cause a lesser drop D than in FIG. 10. FIG. 9 illustrates the approach position in which the film form starts supporting the transducer pad closer to the centerline of the heads than in FIG. 6. In the operating position shown in FIG. 8, there is less bending of the reed spring about area B, that is, less force applied when the loading member 38 is flexed. This will result in a lighter loading force and therefore a wider spacing S than in FIG. 5.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spiirt of the invention. It is the intention, therefore, to be limited only as indicated by the scope of the following claims.

What is claimed is:

1. A magnetic head mounting assembly of the type wherein magnetic heads are adapted to ride on a hydrodynamically created layer of air adhering to the surface of a rapidly rotating magnetic drum, the assembly comprising:

(a) a plurality of side by side magnetic heads, (b) a pad member mounting the heads, (c) a support bar fixedly supported and spaced from the pad member, (d) a deflection member having one end secured to the support bar, (e) a single reed spring having one end secured to the pad member and the other end secured to the other end of the deflection member, and (f) a pair of screw means each threadably engaged in the support bar and the deflection member adjacent the ends thereof for twisting and deflecting the latter to thereby adjust the spacing between ends of the pad member and the magnetic drum and also for initially setting a drop distance between the pad member and the magnetic drum.

2. A magnetic transducer mounting assembly as defined in claim 1, wherein the screw means comprises a pair of differential screws one on either side of the center of the deflection member.

3. A magnetic transducer mounting assembly as defined in claim 1, further including a loading member having one end attached to the reed spring intermediate the ends thereof, motor means connected to the loading member.

4. A magnetic transducer mounting assembly as defined in claim 3 further including an adjustable screw stop for limiting the maximum movement of the loading member.

5. A magnetic transducer mounting assembly of the type wherein magnetic transducers are adapted to ride on a hydrodynamically created layer of air adhering to the surface of a rapidly rotating magnetic drum, the mounting assembly comprising:

(a) a plurality of magnetic transducers, (b) a pad member rigidly mounting the transducers, (c) a support bar fixedly supported above the surface of a magnetic drum, (d) a deflection member having one end secured to the support bar, (e) a single reed spring having one end secured to the pad member and the other end mounted to the other end of the deflection member, (f) a loading member mounted intermediate the ends of the reed spring, (g) a selectively heated bimetallic motor having one end secured to the deflection member and the other end bearing against the loading member, so that upon selective heating the motor flexes, whereby the motor, acting through the loading member, causes the reed spring to pivot toward the magnetic drum to thereby load the transducers on the film of air on the surface of the drum, (h) an adjustable screw stop threadably engaged by the support bar for limiting the maximum movement of the loading member, and (i) a pair of differential screws each threadably engaged by the support member and the deflection member for adjusting and twisting the latter to thereby adjust the axial spacing between the pad member and the magnetic drum and also for initially setting the drop distance between the pad member and the magnetic drum.

6. A magnetic head mounting assembly of the type wherein magnetic heads are adapted to ride on a hydrodynamically created layer of air adhering to the surface of a rapidly rotating magnetic drum, the assembly comprising:

(a) a plurality of magnetic heads,
(b) a pad member rigidly mounting the heads,
(c) a stationary support bar above the surface of a magnetic drum,
(d) a deflection member having one end secured to the support bar,
(e) a single reed spring having one end secured to the pad member and the other end secured to the other end of the deflection member,
(f) screw means threadably engaged in the support bar and the deflection member for flexing and twisting the latter to thereby adjust the spacing between ends of the pad member and the magnetic drum and also for initially setting a drop distance between the pad member and the magnetic drum,
(g) a loading member attached to the reed spring intermediate the ends thereof, and
(h) selectively actuated motor means for moving the loading member and thereby applying a loading force to the heads via the reed spring.

7. A magnetic transducer mounting assembly as defined in claim 6, wherein the motor means is a selectively heated and thermally responsive motor having one end connected to the loading member, and further including an adjustable screw stop in the support bar for limiting the maximum movement of the loading member.

8. A magnetic transducer mounting assembly of the type wherein magnetic transducers are adapted to ride on a hydrodynamically created layer of air adhering to the surface of a rapidly rotating magnetic drum, the mounting assembly comprising:

(a) a plurality of magnetic transducers, (b) a pad rigidly mounting the transducers,
(c) a stationary support bar above the surface of a magnetic drum,
(d) a deflection member having one end secured to the support bar,
(e) a single reed spring having one end secured to the pad member and the other end mounted to the other end of the deflection member,
(f) a loading member mounted intermediate the ends of the reed spring,
(g) a selectively heated bimetallic motor having one end secured to the deflection member and the other end bearing against the loading member, so that upon selective heating the motor flexes, whereby the motor, acting through the loading member, causes the reed spring to pivot toward the magnetic drum to thereby bias the transducers into the air film to an operative position tangential to the surface of the drum,
(h) a spring connected return between the deflection member and loading member,
(i) an adjustable screw stop with a lock nut threadably engaged by the support bar for limiting the maximum movement of the loading member, and
(j) a pair of differential screws each threadably engaged by the support member and the deflection member on opposite sides of the center of the latter for flexing the deflection member to thereby adjust for any uneven spacing between the pad and the magnetic drum and also for initially setting the drop distance between the pad and the magnetic drum.

References Cited by the Applicant

UNITED STATES PATENTS

| | | |
|---|---|---|
| 3,140,362 | 7/1964 | Cheney et al. |
| 3,177,495 | 4/1965 | Felts. |
| 3,180,944 | 4/1965 | Stover. |
| 3,187,315 | 6/1965 | Cheney. |

BERNARD KONICK, *Primary Examiner.*

A. I. NEUSTADT, *Assistant Examiner.*